(12) United States Patent
Krause et al.

(10) Patent No.: US 11,597,267 B2
(45) Date of Patent: Mar. 7, 2023

(54) COMPACT POWERTRAIN WITH AN ELECTRIC MOTOR

(71) Applicant: BRUSA Electronik AG, Sennwald (CH)

(72) Inventors: Axel Krause, Nesslau (CH); Pascal Haltner, Sax (CH); Simon Islinger, Munich (DE); Nikola Ivancic, Munich (DE); Andreas Müller, Sennwald (CH); Martin Breu, Munich (DE); Lukas Böhler, Sennwald (CH); Konrad Zegula, Munich (DE)

(73) Assignee: BRUSA ELECTRONIK AG, Sennwald (CH)

( * ) Notice: Subject to any disclaimer, the term of this patent is extended or adjusted under 35 U.S.C. 154(b) by 139 days.

(21) Appl. No.: 17/086,193

(22) Filed: Oct. 30, 2020

(65) Prior Publication Data
US 2021/0129654 A1 May 6, 2021

(30) Foreign Application Priority Data

Oct. 31, 2019 (EP) .................................. 19206594
Oct. 28, 2020 (EP) .................................. 20204394

(51) Int. Cl.
*B60K 6/405* (2007.10)
*B60K 6/445* (2007.10)
(Continued)

(52) U.S. Cl.
CPC .............. *B60K 6/405* (2013.01); *B60K 6/445* (2013.01); *B60K 11/02* (2013.01); *B60K 17/24* (2013.01);
(Continued)

(58) Field of Classification Search
CPC ........ B60K 6/405; B60K 6/445; B60K 11/02; B60K 17/24; H02K 7/006; H02K 7/116; B60Y 2400/61
See application file for complete search history.

(56) References Cited

U.S. PATENT DOCUMENTS 7,963,353 B2 * 6/2011 Tatematsu ............... B60L 50/16
180/65.22
8,074,753 B2 * 12/2011 Tahara ..................... H02K 9/19
180/65.21
(Continued)

FOREIGN PATENT DOCUMENTS

CN 107985045 A 5/2018
DE 19714784 A1 10/1998
(Continued)

*Primary Examiner* — Erez Gurari
(74) *Attorney, Agent, or Firm* — David Jones; Nadesan Beck P.C.

(57) ABSTRACT

Powertrain, comprising an inverter unit comprising an inverter configured for converting direct current to alternating current and an inverter housing defining an inverter housing interior volume accommodating the inverter, and an electric motor comprising a rotor and a stator, the rotor defining a motor axis and the electric motor being configured for providing torque, and an electric motor housing, and a reducing gear unit comprising a reducing gear and a reducing gear cover surrounding the reducing gear, the reducing gear defining an output reducing gear axis, wherein the output reducing gear axis is parallel to the motor axis, and in that the reducing gear cover and the inverter housing are arranged at opposite ends of the electric motor with respect to the motor axis, and in that the inverter housing comprises a cut-out, wherein the cut-out defines a cut-out region fully contained within the convex hull of the inverter housing, wherein the cut-out region is disjoint from the inverter housing interior volume, and in that the output reducing gear axis passes through the cut-out region without (Continued)

passing through the inverter housing interior volume. Inductive charging module may be rigidly attached to at least one of the inverter housing, the electric motor housing, the reducing gear cover, and the inductive charging module may be configured to utilize electric components of the inverter, and/or the inductive charging module may be configured to be cooled by a liquid cooling circuit cooling the inverter and/or the electric motor and/or the reducing gear unit.

18 Claims, 4 Drawing Sheets

(51) Int. Cl.
*B60K 11/02* (2006.01)
*B60K 17/24* (2006.01)
*H02K 7/00* (2006.01)
*H02K 7/116* (2006.01)

(52) U.S. Cl.
CPC ............ *H02K 7/006* (2013.01); *H02K 7/116* (2013.01); *B60Y 2400/61* (2013.01)

(56) References Cited

U.S. PATENT DOCUMENTS

| | | | | |
|---|---|---|---|---|
| 8,896,166 | B2* | 11/2014 | Hofkirchner | H02K 11/33 310/59 |
| 9,821,650 | B2* | 11/2017 | Falls | H02K 11/30 |
| 10,252,609 | B2* | 4/2019 | Falls | B60K 7/0007 |
| 10,272,767 | B1* | 4/2019 | Tang | F01P 7/164 |
| 10,396,631 | B2* | 8/2019 | Herb | H02K 9/197 |
| 2009/0250271 | A1* | 10/2009 | Komatsu | B60K 6/26 180/65.6 |
| 2012/0313465 | A1* | 12/2012 | Prix | H02K 5/203 310/59 |
| 2013/0009450 | A1* | 1/2013 | Suzuki | H02K 7/116 301/6.5 |
| 2013/0220718 | A1* | 8/2013 | Gotou | B62D 21/11 180/65.6 |
| 2014/0035407 | A1* | 2/2014 | Uryu | H02K 7/116 310/71 |
| 2016/0039277 | A1* | 2/2016 | Falls | H02K 11/30 310/58 |
| 2020/0328652 | A1* | 10/2020 | Miki | H02K 5/203 |
| 2020/0408297 | A1* | 12/2020 | Ishikawa | F16H 57/0471 |
| 2021/0313860 | A1* | 10/2021 | Jang | B60K 11/02 |
| 2022/0205530 | A1* | 6/2022 | Ishikawa | F16H 57/045 |
| 2022/0247281 | A1* | 8/2022 | Nihira | H02M 7/48 |
| 2022/0305892 | A1* | 9/2022 | Ishikawa | H02K 9/19 |
| 2022/0316582 | A1* | 10/2022 | Inoue | H02K 9/19 |
| 2022/0321050 | A1* | 10/2022 | Jono | B60L 15/20 |

FOREIGN PATENT DOCUMENTS

| | | |
|---|---|---|
| DE | 102018209340 B3 | 4/2019 |
| DE | 102018203366 A1 | 9/2019 |
| WO | 2017054687 A1 | 4/2017 |

* cited by examiner

COMPACT POWERTRAIN WITH AN ELECTRIC MOTOR

CROSS-REFERENCE TO RELATED APPLICATIONS

This patent application claims priority to European Patent Application No. 19206594.4, filed on Oct. 31, 2019 and European Patent Application No. 20204394.9, filed on Oct. 28, 2020, the contents of both of the aforementioned patents are hereby incorporated by reference herein in their entireties and for all purposes.

FIELD OF THE INVENTION

The present invention relates to a powertrain for use in electric motor vehicles, wherein electric motor vehicle denominates a vehicle propelled at least partly by electrical power from a battery contained in the vehicle. The invention further relates to an electric motor vehicle containing such a powertrain.

BACKGROUND

It is often beneficial to provide compact assemblies of powertrains. For example, due to compact packaging, it is possible to save space, and thus to improve packaging of different components of a vehicle. A compact assembly furthermore reduces losses such as power losses in the connection between inverter and electric motor. A compact assembly additionally facilitates a high rotational speed of the electric motor. An electric motor vehicles may additionally comprise an inductive charging module which may be used—paired with an external module outside of the electric motor vehicle—to e.g. charge a battery in the electric motor vehicle. In state of the art electric motor vehicles, the inductive charging module is typically placed apart from the electric motor.

A compact assembly of a powertrain has been disclosed in DE 19714784A1, for example. DE 19714784A1 disclosed a compact arrangement of powertrain components, with an electric motor positioned in between a gear unit and an inverter. The arrangement disclosed in DE 19714784A1 allows for only one output at which an outside mechanical load can be applied.

WO 2017054687A1 discloses a powertrain arrangement, with an electric motor, a gear unit and an inverter positioned in this order along a common axis. Due to the specific arrangement of the powertrain components as disclosed in WO 2017054687A1, the entire powertrain predominantly extends in one direction, namely along the common axis. This leads to a disadvantageously large extension along this axis. This arrangement furthermore leads to relatively long electrical conductor lengths in the electrical connection between inverter and motor, giving rise to increased electrical power losses.

It is therefore an objective of the present invention to provide an improved powertrain arrangement enabling more versatile options for integrating the powertrain arrangement in a vehicle, which, for example, also provides for improved packaging of components within a vehicle, leading to a reduced extension along a main axis of the assembly (installation length). A further objective of the present invention is to provide an improved powertrain arrangement comprising an inductive charging module.

SUMMARY

One aspect of this invention is to provide a compact powertrain arrangement, wherein the entire powertrain fits tightly into a rectangular cuboid, with two outputs at which outside mechanical loads can be applied. To this end, a differential is used which allows for different rotational speeds at the two outputs, the reducing gear and the differential being at an opposite end of the electric motor as compared to the inverter. The output reducing gear axis through the differential passes through the inverter housing at the other end of the electric motor. This setup allows to build a powertrain arrangement whose spatial dimensioning is approximately symmetric around a center point, wherein the entire powertrain can be tightly fit into a rectangular cuboid, particularly wherein the provided compact powertrain has a similar extent along the three spatial directions of a Cartesian coordinate system. The compact powertrain arrangement is achieved through the use of a cut-out in the inverter housing through which the output axis passes. The hole in the inverter housing allows to reduce the installation length of the entire powertrain (without increasing the extension of the powertrain assembly in one of the lateral directions). This arrangement allows furthermore for small electrical conductor lengths in the electrical connection between inverter and motor, leading to minimum electrical power losses.

The invention relates to a first powertrain comprising an inverter unit comprising an inverter configured for converting direct current to alternating current and an inverter housing defining an inverter housing interior volume accommodating the inverter, and an electric motor comprising a rotor and a stator, the rotor defining a motor axis and the electric motor being configured for providing torque, and an electric motor housing, and a reducing gear unit comprising a reducing gear and a reducing gear cover surrounding the reducing gear, the reducing gear defining an output reducing gear axis, wherein the output reducing gear axis is parallel to the motor axis, and in that the reducing gear cover and the inverter housing are arranged at opposite ends of the electric motor with respect to the motor axis, and in that the inverter housing comprises a cut-out, wherein the cut-out defines a cut-out region fully contained within the convex hull of the inverter housing, wherein the cut-out region is disjoint from the inverter housing interior volume, and in that the output reducing gear axis passes through the cut-out region without passing through the inverter housing interior volume.

Arranging a powertrain according to the inventive concept described above offers numerous benefits. The cut-out through which the output reducing gear axis pierces the inverter housing allows to minimize the axial length of the powertrain, hence allowing to reduce the installation length as the inverter housing can be made flat. The cut-out additionally allows for compact dimensioning as the output reducing gear axis can be positioned directly next to the electric motor housing without colliding with the inverter housing. Parallel motor and output reducing gear axes allow for a compact powertrain which has a similar spatial extent along the three independent axes of a Cartesian coordinate system. Such a compact powertrain can be easily integrated into a vehicle.

In an embodiment of the first powertrain according to the invention, an inductive charging module is rigidly attached to at least one of a) the electric motor housing, b) the inverter housing, c) the reducing gear cover, wherein the electric motor and the inductive charging module are configured to use the inverter.

An inductive charging module may typically be combined with an external module placed outside of an electric vehicle in which the inductive charging module is installed, wherein the external module may generate temporally and spatially varying electromagnetic fields which in turn induce currents in the inductive charging module. The inductive charging module may be attached without backlash to at least one of a) the electric motor housing, b) the inverter housing, c) the reducing gear cover.

An inductive charging module is typically used with a rectifier for converting induced alternating current to direct current so that a battery may be charged, for example. An electric motor on the other hand typically requires an inverter for converting direct current. from a battery to alternating current to power a three-phase electric motor. The inverter may e.g. comprise silicon carbide (SiC) MOSFETs which may be used bi-directionally, the same MOSFETs being used for rectification and for inverting. In general, some power electronics components and circuits used for controlling the electric motor (or for recuperation, for example) may also be used by the inductive charging module.

Attaching the inductive charging module to the electric motor housing and/or to the inverter housing and/or to the reducing gear cover leads to a better overall integration of a powertrain. Since the inductive charging module is attached to the electric motor housing and/or to the inverter housing and/or to the reducing gear cover, vibrations or general movements of the powertrain affect the electric motor housing and the inductive charging module and/or the inverter housing and the inductive charging module and/or the reducing gear cover and the inductive charging module similarly. The inductive charging module is rigidly and tightly attached to the electric motor housing and/or to the inverter housing and/or to the reducing gear cover. The electric motor housing and/or the inverter housing and/or the reducing gear cover may additionally also cool the inductive charging module, particularly in case the electric motor housing and/or the inverter housing and/or the reducing gear cover are made of thermally conductive material. Attaching the inductive charging module to the electric motor housing and/or to the inverter housing and/or to the reducing gear cover furthermore reduces the number of external connectors required for the inductive charging module.

In an embodiment of the first powertrain according to the invention, the electric motor, the electric motor housing and the reducing gear are contained in the volume enclosed by the convex hull of the reducing gear cover and the inverter housing.

The convex hull of a set of points is the smallest convex set containing the points. In this embodiment, the convex hull is determined by both the reducing gear cover and the inverter housing. Since the powertrain is contained in said convex hull, it is hence guaranteed that the entire powertrain arrangement is compact, and, for example, can be built with essentially symmetric spatial dimensioning. For example, the invention allows for arranging the electric motor or the reducing gear or both such that protrusion is minimized, i.e. none of them protrudes too far out (they always have to be contained in the specific convex hull). Small protrusions away from said convex hull are understood to be subsumed by this embodiment of the invention.

In another embodiment of the first powertrain according to the invention, the results of an orthogonal projection of the convex hull of the reducing gear cover, and a separate orthogonal projection of the convex hull of the inverter housing, onto a projection plane orthogonal to a plane spanned by the output reducing gear axis and the motor axis, and the output reducing gear axis and the motor axis, are substantially similar in size and shape, wherein the two orthogonal projection results are substantially overlapping in the projection plane, wherein the convex hull of the reducing gear cover and the inverter housing is in particular substantially similar to a rectangular cuboid.

The convex hull specification, together with the specification that both motor axis and output reducing gear axis are parallel to one another, ensures therefore that both the electric motor and the reducing gear can be shadowed by the reducing gear cover and the inverter housing, insofar as an observer looking frontally at e.g. the inverter housing would not be able to see the electric motor and the reducing gear. Due to the absence of protruding components the entire powertrain can be easily integrated into a vehicle (above considerations regarding small protrusions apply here analogously).

In a further embodiment of the first powertrain according to the invention, the cut-out region is substantially embodied as a cylinder, or as a cone, or as a cuboid with rounded edges or as a long hole, wherein the inverter housing is topologically equivalent to a torus.

In another embodiment of the first powertrain according to the invention, the powertrain comprises at least two mechanical energy transmitting external interfaces, wherein one of the mechanical energy transmitting external interfaces is located in the cut-out region.

The mechanical energy transmitting external interfaces may be provided in the form of a shaft coupling, in particular in the form of flanges, for example. Other shaft coupling types are of course also possible (e.g. clamping couplings, U-joints, flexible couplings, tooth couplings etc.).

In a further embodiment of the first powertrain according to the invention, the reducing gear comprises at least a first and a second reducing gear stage and a differential, wherein at least one of the two reducing gear stages is embodied as spur gears. The other gear stage(s) of the reducing gear can be embodied e.g. as planetary gears, bevel gears or also as spur gears.

In a further embodiment of the first powertrain according to the invention, at least one non-mechanical energy transmitting external interface of the powertrain is located between the inverter unit and the reducing gear unit, wherein the at least one non-mechanical energy transmitting external interface is positioned on those parts of the inverter housing or of the electric motor housing within the convex hull of the reducing gear cover and the inverter housing. The non-mechanical energy transmitting external interface may be provided e.g. in the form of an electrical plug connection or a plugless fixed electrical connection for connecting the powertrain to an electrical power source.

Using the space in between the inverter unit and the reducing gear is optimal as it facilitates integration of the powertrain into a vehicle. The space can be optimally utilized if the free space in the powertrain is used up for an external non-mechanical energy transmitting interface. Integration in general can then be simplified. The space can for example be used for optimal placement of the electrical cables needed for connecting the powertrain to an electrical power source in consideration of the minimum required cable bending radius.

In another embodiment of the first powertrain according to the invention, the parallel offset of the output reducing gear axis to the motor axis is determined by the diameter of the stator, wherein the ratio of the offset of the output reducing gear axis to the motor axis, to the diameter of the stator, has numerical values between 0.5 and 1.0, in particular between 0.6 and 0.8.

In another embodiment of the first powertrain according to the invention, the inverter comprises a set of electrical components located in the intersection volume of a first half-space defined by a hypothetical plane, and the inverter housing interior volume, the hypothetical plane being orthogonal to a plane spanned by the output reducing gear axis and the motor axis, and containing the output reducing gear axis, wherein the electric motor is located within the first half-space.

In another embodiment of the first powertrain according to the invention, the inverter comprises at least one additional electrical component placed in the intersection volume of a second half-space defined by the hypothetical plane, the second half-space being uniquely determined through the choice of the first half-space, wherein the union of the first half-space and the second half-space corresponds to the full three-dimensional space, and the inverter housing interior volume.

By way of example, this arrangement of components of the inverter unit optimally utilizes the space given by a rectangular cuboid in which the powertrain can for example be located. Since there is in general some space in between the output reducing gear axis and the faces of a rectangular cuboid containing the powertrain, for example, this space can be used for positioning components of the inverter unit in it.

In a further embodiment of the first powertrain according to the invention, the inverter comprises a first and a second set of electrical components, each of the two sets including at least one capacitor, at least three power switches, at least three bus bars and a liquid cooling device, wherein for every component of the first set a corresponding twin component in the second set exists with substantially equal electrical properties, wherein each component of the first set and its twin component in the second set are arranged at twin positions within the inverter housing interior volume with respect to the plane spanned by the output reducing gear axis and the motor axis, wherein the twin positions are characterized in that the orthogonal projections of any component of the first set and of its corresponding twin component in the second set onto the plane spanned by the output reducing gear axis and the motor axis are overlapping and substantially similar in size and shape, wherein the corresponding twin component is rotated in space around its geometric center by any amount before the orthogonal projection, wherein in particular no rotation at all is performed on the corresponding twin component before the orthogonal projection.

The two sets of electrical components can be arranged in a mirrored assembly, for example. In the mirrored assembly, the orientation and position of the second set of electrical components would be obtained by reflecting the first set of electrical components at a plane spanned by the output reducing gear axis and the motor axis, the plane passing through the cut-out region. Instead of being a reflected version of some electrical components of the first set, some electrical components of the second set of electrical components could also correspond to translated and rotated versions of the corresponding components from the first set. The translation direction could be orthogonal to the plane spanned by the output reducing gear axis and the motor axis, and the rotation of an electrical component can be understood with respect to its geometric center, so that the rotation would not induce a translation of the rotated electrical component.

In a further embodiment of the first powertrain according to the invention, the powertrain comprises a first liquid cooling circuit which is configured to cool the electrical components of the inverter as well as the stator of the electric motor. The first liquid cooling circuit can for example be embodied as a water cooling circuit (wherein the water of course can contain further substances and/or additives, e.g. monoethylene glycol or other refrigerants).

In a further embodiment of the first powertrain according to the invention, the powertrain further comprises a second liquid cooling circuit which is configured to cool the reducing gear unit as well as the rotor and/or the stator of the electric motor, and a heat exchanger which is configured to exchange heat between the first and the second liquid cooling circuit, wherein the heat exchanger is located in the volume enclosed by the convex hull of the reducing gear cover and the inverter housing.

The convex hull in this embodiment is set up by both the reducing gear cover and the inverter housing. The second liquid cooling circuit can for example be embodied as an oil cooling circuit. The second liquid cooling circuit can cool both the rotor and also the windings (or the winding head resp.) of the stator.

In a further embodiment of the first powertrain according to the invention, the first liquid cooling circuit and/or the second liquid cooling circuit is further configured to cool the inductive charging module.

The first and/or second liquid cooling circuit is additionally configured to cool the inductive charging module. The first liquid cooling circuit can for example be embodied as a water cooling circuit (wherein the water of course can contain further substances and/or additives, e.g. monoethylene glycol or other refrigerants) or as an oil cooling circuit. The integration of the powertrain may lead to a reduced number of cooling devices required as a cooling circuit used for cooling the electric motor and/or the inverter and/or the reducing gear unit is used for cooling the inductive charging module as well.

In another embodiment of the first powertrain according to the invention, an electromagnetic compatibility (EMC) filter is mounted in the inverter housing.

The EMC filter can be mounted close to the additional inverter component or the additional inverter component comprises the EMC filter. In this embodiment of the invention, the compact volume containing the powertrain is optimally used.

In another embodiment of the first powertrain according to the invention, the maximum rotational speed of the electric motor is configured to be between 12000 and 25000 rotations per minute.

A high rate of rotations per minute of the electric motor is feasible due to the compact size of the entire powertrain. Smaller electric motors in general allow for higher rates of rotation. An electric motor whose stator has a diameter of 200 mm can be designed, for example, wherein such an electric motor can have a maximum rotational speed of 24000 rotations per minute. Electric motors with larger stator diameters in general only allow for smaller maximum rates of rotation.

In a further embodiment of the first powertrain according to the invention, the inductive charging module is substantially attached to a side of the powertrain, wherein the inductive charging module is in particular attached to a joint bottom side of the powertrain, wherein joint bottom refers to a side of the powertrain after integration into an electric motor vehicle.

The joint bottom side is the side facing ground. Since the external module outside of the electric motor vehicle is typically installed in the ground, the inductive charging module may face the external module.

The invention relates to a second powertrain, comprising a) an inverter unit comprising an inverter and an inverter housing accommodating the inverter, and b) an electric motor comprising a rotor and a stator, the electric motor being configured for providing torque, and an electric motor housing, and c) an inductive charging module, wherein the inductive charging module is attached to the electric motor housing and/or to the inverter housing, and in that the electric motor and the inductive charging module are configured to use the inverter.

The invention relates to a third powertrain, comprising a) an inverter unit comprising an inverter comprising electrical components, and an inverter housing accommodating the inverter, and b) an electric motor comprising a rotor and a stator, the electric motor being configured for providing torque, and an electric motor housing, and c) an inductive charging module, and d) a liquid cooling circuit, wherein the inductive charging module is attached to the electric motor housing and/or to the inverter housing, and in that the liquid cooling circuit is configured to jointly cool the inductive charging module and at least one of the electrical components of the inverter and the electric motor.

The third powertrain according to the invention may lead to a reduced number of cooling devices required as a cooling circuit used for cooling the electric motor and/or the inverter is used for cooling the inductive charging module as well.

The inductive charging module may comprise both magnetic parts and electronics. The magnetic parts and the electronics may also be cooled using different liquid cooling circuits.

In an embodiment of the second powertrain according to the invention, the inductive charging module is attached in a rigid manner and without backlash to the electric motor housing and/or to the inverter housing, and/or the powertrain comprises only one external connection to an external battery, and/or the inductive charging module does not comprise separate power electronics components.

The external battery is typically the battery from which an electric motor vehicle draws energy needed for propelling the vehicle.

In an embodiment of the third powertrain according to the invention, the inductive charging module is attached in a rigid manner and without backlash to the electric motor housing and/or to the inverter housing, and/or no separate liquid cooling circuit is used for cooling at least one of, in particular both of, the inductive charging module and the inverter, and/or the inductive charging module comprises an electric wiring configured to produce an induced voltage, and the inductive charging module comprises an inductive charging module housing having an inductive charging module housing first side facing the electric motor housing and/or the inverter housing, wherein a cooling liquid used in the liquid cooling circuit is configured to flow along the inductive charging module housing first side, in particular by coming into contact with the inductive charging module housing first side, and wherein the cooling liquid is configured to pass, in particular embed in the cooling liquid, at least a part of a least one of the electric motor and the inverter, and/or the liquid cooling circuit is configured to cool the stator of the electric motor.

The inductive charging module may comprise inductive charging module channels in the inductive charging module housing, in particular in the inductive charging module housing first side, through which the cooling liquid may flow. The inductive charging module channels may be continuously connected to cooling channels configured to cool the electric motor and/or the inverter.

The invention also relates to an electric motor vehicle comprising a powertrain, wherein a driving wheel is connected via a drive shaft to each of the mechanical energy transmitting external interfaces.

BRIEF DESCRIPTION OF THE DRAWINGS

The inventive system is described below in more detail purely by way of example with the aid of concrete exemplary embodiments illustrated schematically in the drawings, further advantages of the invention also being examined. Identical elements are labelled with the same reference numerals in the figures. In detail.

DETAILED DESCRIPTION

Figure 1:
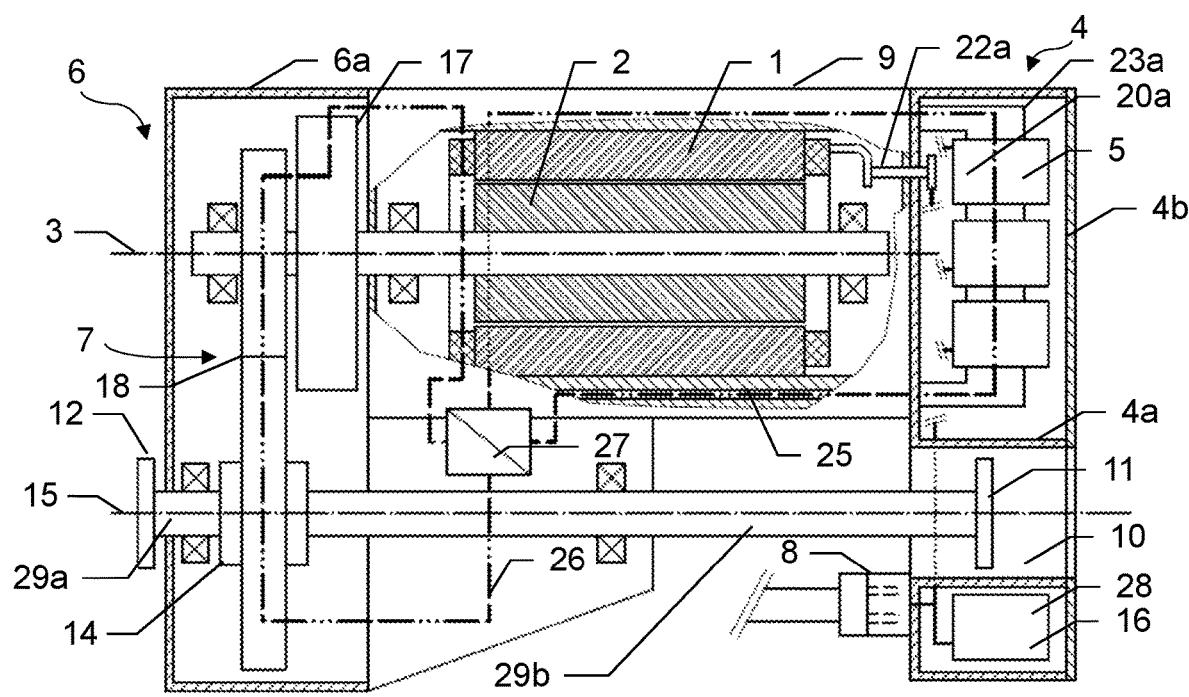
FIG. 1 shows a schematic depiction of a powertrain arrangement according to the invention.

FIG. 1 shows a schematic depiction of a powertrain arrangement according to the invention. A stator 1 as well as a rotor 2 contained therein, with the rotor 2 defining a motor axis 3, are placed in between a reducing gear unit 6 and an inverter unit 4,5,16. The reducing gear unit comprises a reducing gear cover 6a, reducing gears 7,17,18 and a differential 14. The inverter unit 4,5,16 comprises an inverter housing 4 as well as an inverter 5,16 contained within the inverter housing 4. The inverter housing 4 consists of a housing body 4a and a housing cover 4b. The inverter 5,16 comprises (besides optionally other and here not further specified components) a first set of components 5 close to the stator 1, and an additional component 16. An EMC filter 28 is additionally provided next to the additional component 16 or alternatively the additional component 16 comprises the EMC filter 28. The first set of components 5 of the inverter comprises a first set 5a of electrical components and a second set 5b of electrical components. Both the first set 5a of electrical components and the second set 5b of electrical components comprise the same number of electrical components, wherein each of the two sets 5a, 5b comprises at least one capacitor 20a,20b, at least three power switches 21a,21b, at least three bus bars 22a,22b and a liquid cooling device 23a,23b. The overall assembly of the sets 5a,5b of electrical components can be mirrored, to each electrical component of the first set 5a belonging a twin electrical component of the second set 5b at a mirrored position. In a particularly advantageous configuration each of the two sets 5a, 5b comprises three capacitors 20a,20b, six power switches 21a,21b, three bus bars 22a,22b and a liquid cooling device 23a,23b.

This mirrored assembly divides the total inverter current by two in each inverter section; this allows to reduce current densities in the inverter unit 4,5,16 compared to state of the art inverters, while the inverter unit 4,5,16 with the mirrored assembly has a similar overall power density as the state of the art, wherein the power density is defined as the overall power provided by the inverter unit 4,5,16 divided by the volume enclosed by the inverter housing 4. Smaller current densities in the inverter unit 4,5,16 minimize undesired effects like overvoltage due to parasitic inductances in the inverter unit 4,5,16, thereby improving switching behaviour of the semiconductors of the inverter. Larger current densities would additionally require larger wire cross sections. Reducing the current densities is therefore technically beneficial.

The reducing gear unit 6 defines an output reducing gear axis 15 passing through the differential 14. The output reducing gear axis 15 is parallel to the motor axis 3. The output reducing gear axis 15 passes through the inverter housing 4, wherein the inverter housing 4 contains a cut-out 10, and the output reducing gear axis 15 passes through the cut-out region of the inverter housing 4. Within the cut-out region, a mechanical energy transmitting external interface 11 is mounted, wherein the mechanical energy transmitting external interface 11 is in particular embodied as a flange, the mechanical energy transmitting external interface 11 providing the possibility for an outside shaft to be attached to the powertrain. At the other end of the output reducing gear axis 15, another mechanical energy transmitting external interface 12 is provided, wherein the mechanical energy transmitting external interface 12 is in particular embodied as a flange. The two mechanical energy transmitting external interfaces 11 and 12 are connected to the differential 14 by two output shafts 29a,29b arranged coaxially to the output reducing gear axis 15. The two output shafts 29a,29b transmit the mechanical energy provided to the differential 14 by the motor 1,2 via the at least two gear stages 17,18 from the differential 14 to the two mechanical energy transmitting external interfaces 11 and 12. The differential 14 allows for shafts attached to the two mechanical energy transmitting external interfaces 11,12 to rotate at different speeds.

The electric motor 1,2 is contained within the electric motor housing 9. A non-mechanical energy transmitting external interface 8 is located in the space in between the reducing gear cover 6a and the inverter housing 4 not filled up by the electric motor housing 9.

The powertrain of FIG. 1 comprises two liquid cooling circuits 25,26. The first liquid cooling circuit 25 is configured to cool at least some of the heat generating components of the inverter 5,16 as well as the stator 1, while the second liquid cooling circuit 26 is configured to cool the gear stages of reducing gear unit 6 and parts of the electrical motor 1,2 (such as the winding heads and/or the rotor).

The liquids in the first 25 and second cooling circuit 26 can exchange heat via a heat exchanger 27 thermally connecting the first 25 and the second liquid cooling circuit 26.

Figure 2:
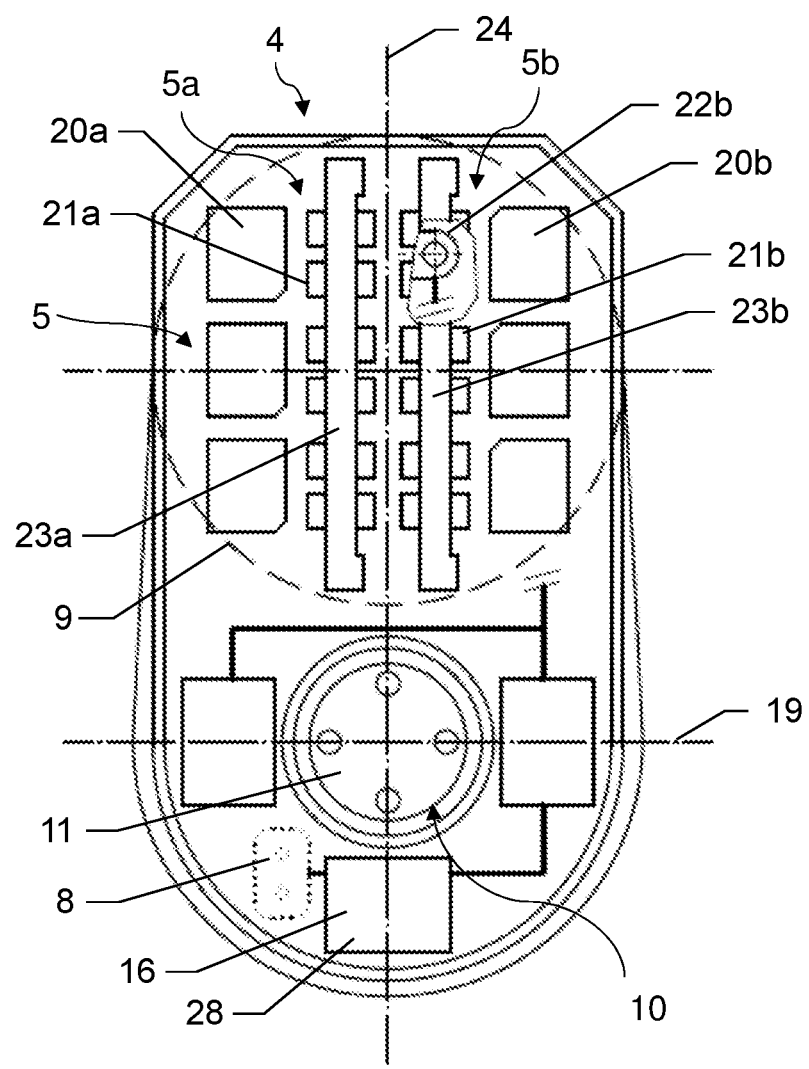
FIG. 2 shows an illustration of a frontal view of an inverter unit according to the invention.

FIG. 2 shows a frontal view of the inverter unit 4,5,16 after removing the housing cover 4b. A mirrored assembly of six capacitors 20a,20b, twelve power switches 21a,21b, six bus bars 22a,22b and two liquid cooling devices 23a,23b is shown (only one of the bus bars is visible in the figure within a cut away view section since the bus bars are positioned below the other components of the assembly). The reflection implicit in the mirrored assembly is defined with respect to a mirror plane 24, the mirror plane 24 passing through the cut-out 10 and being defined by the output reducing gear axis 15 and the motor axis 3. The cut-out 10 through which the output reducing gear axis 15 passes is is in particular cylindrical in form. An output shaft 29b (not visible in the figure) going through the cylindrical cut-out 10 can be efficiently connected to a mechanical energy transmitting external interface 11, in particular embodied as a flange. As shown in FIG. 2, the first set of components 5 of the inverter is arranged close to the electrical motor 1,2, the closeness depicted through the projection of the electrical motor housing 9 onto a plane orthogonal to the mirror plane 24 and orthogonal to the output reducing gear axis 15 and the motor axis 3. The volume contained by the inverter housing 4 is efficiently used. On both sides of the cut-out 10, the two sides understood with respect to the hypothetical plane 19, components of the inverter 5,16 are placed.

Figure 3:
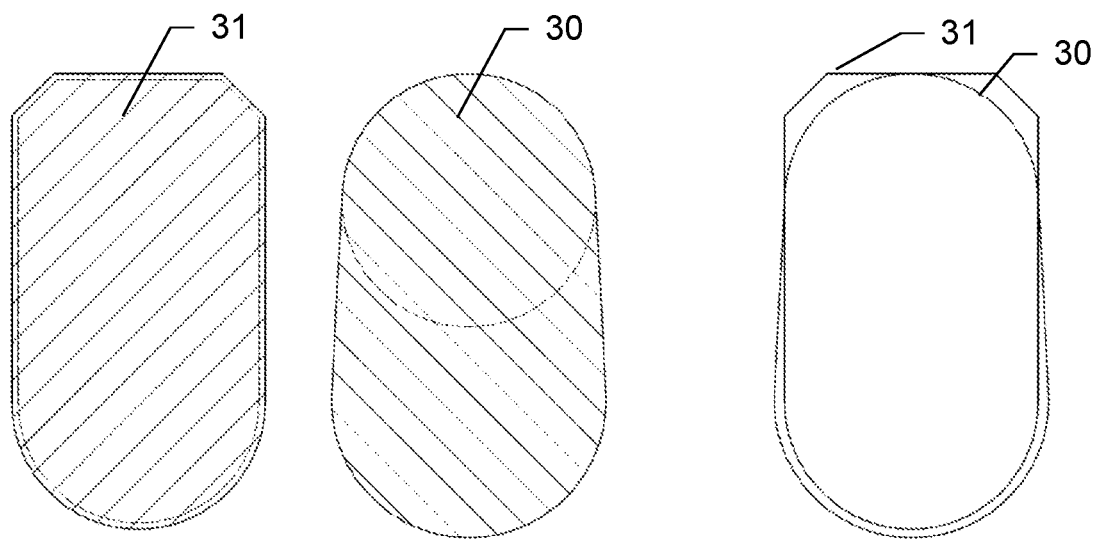
FIG. 3 shows an illustration of the results of separate orthogonal projections of the convex hull of the reducing gear cover and of the convex hull of the inverter housing onto the same plane.

FIG. 3 shows the result 30 of the orthogonal projection of the convex hull of the reducing gear cover 6a onto a plane orthogonal to both the mirror plane 24 and the hypothetical plane 19 as well as the result 31 of the orthogonal projection of the convex hull of the inverter housing 4 onto a plane orthogonal to both the mirror plane 24 and the hypothetical plane 19. The results 30,31 of the two orthogonal projections are substantially similar in size and shape and are overlapping. The projection results 30,31 are substantially similar to a rectangle. This again is a consequence of the fact that the convex hull of the reducing gear cover 6a and the inverter housing 4 is substantially similar to a rectangular cuboid.

Figure 4:
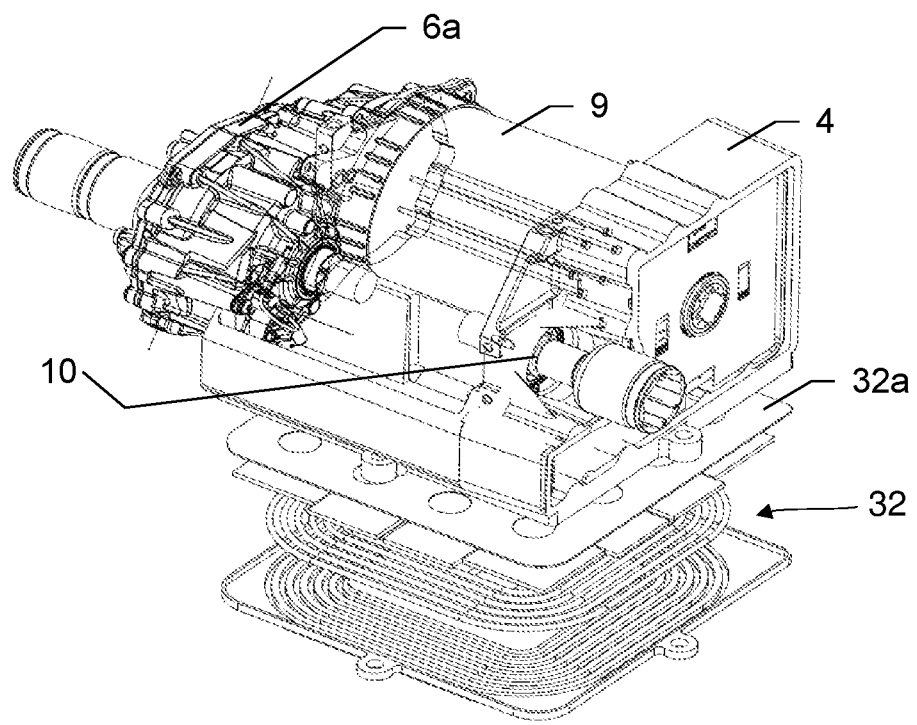
FIG. 4 shows an illustration of a powertrain arrangement according to the invention with an inductive charging module.

FIG. 4 shows a powertrain according to the invention viewed from outside. The reducing gear cover 6a, the electric motor housing 9 and the inverter housing 4 with the cut-out 10 are visible. The inductive charging module 32 is shown in an expanded form in which the coils needed for inducing currents are visible. The inductive charging module 32 is firmly attached to the inverter housing 4. The inductive charging module housing first side 32a faces the reducing gear cover 6a, the electric motor housing 9 and the inverter housing 4.

Figure 5:
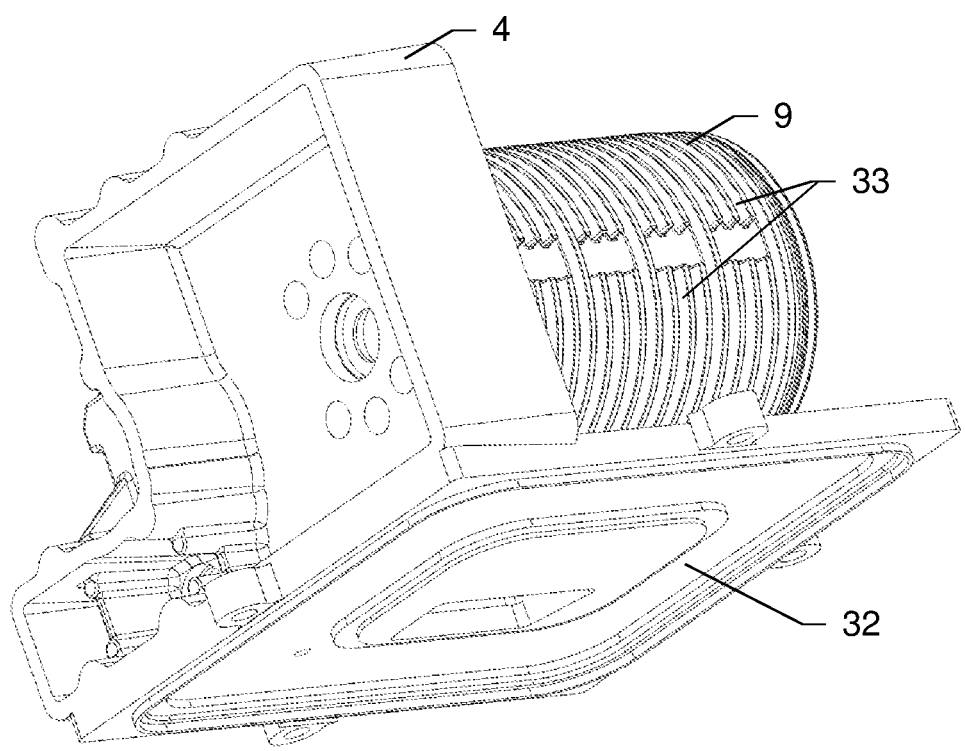
FIG. 5 shows a further illustration of a powertrain arrangement according to the invention with an inductive charging module.

FIG. 5 shows an inverter housing 4, an electric motor housing 9 and an inductive charging module housing containing inductive charging module components in compressed form, wherein the compressed form corresponds to an expanded form as in FIG. 4 after compression along one axis. The inductive charging module 32 is firmly attached to the inverter housing 4, and the attachment of the inductive charging module 32 to the inverter housing 4 is free of play. Cooling channels 33 on the electric motor housing 9 through which cooling liquid may flow are shown as well. The cooling channels may be continuously connected to inductive charging module channels (not shown) placed in the inductive charging module housing first side facing the electric motor housing 9.

It goes without saying that these figures illustrated are merely schematics of possible exemplary embodiments.

Although the invention is illustrated above, partly with reference to some preferred embodiments, it must be understood that numerous modifications and combinations of different features of the embodiments can be made. All of these modifications lie within the scope of the appended claims.

We claim:

1. Powertrain, comprising:
   an inverter unit comprising an inverter configured for converting direct current to alternating current and an inverter housing defining an inverter housing interior volume accommodating the inverter;
   an electric motor comprising a rotor and a stator, the rotor defining a motor axis and the electric motor being configured for providing torque, and an electric motor housing; and
   a reducing gear unit comprising a reducing gear and a reducing gear cover surrounding the reducing gear, the reducing gear defining an output reducing gear axis, wherein the output reducing gear axis is parallel to the motor axis, and in that the reducing gear cover and the inverter housing are arranged at opposite ends of the electric motor with respect to the motor axis, and in that the inverter housing comprises a cut-out, wherein the cut-out defines a cut-out region fully contained within the convex hull of the inverter housing, wherein the cut-out region is disjoint from the inverter housing interior volume, and in that the output reducing gear axis passes through the cut-out region without passing through the inverter housing interior volume.

2. Powertrain according to claim 1, wherein an inductive charging module is rigidly attached to at least one of:
the electric motor housing,
the inverter housing, and
the reducing gear cover, and
wherein the electric motor and the inductive charging module are configured to use the inverter.

3. Powertrain according to claim 1, wherein the electric motor, the electric motor housing and the reducing gear are contained in the volume enclosed by the convex hull of the reducing gear cover and the inverter housing.

4. Powertrain according to claim 3, wherein the results of an orthogonal projection of the convex hull of the reducing gear cover, and a separate orthogonal projection of the convex hull of the inverter housing, onto a projection plane orthogonal to:
a plane spanned by the output reducing gear axis and the motor axis, and
the output reducing gear axis and the motor axis,
are substantially similar in size and shape, wherein the two orthogonal projection results are substantially overlapping in the projection plane, wherein the convex hull of the reducing gear cover and the inverter housing is in particular substantially similar to a rectangular cuboid.

5. Powertrain according to claim 1, wherein the cut-out region is substantially embodied as a cylinder, or as a cone, or as a cuboid with rounded edges or as a long hole, wherein the inverter housing is topologically equivalent to a torus.

6. Powertrain according to claim 1, wherein the powertrain comprises at least two mechanical energy transmitting external interfaces, wherein one of the mechanical energy transmitting external interfaces is located in the cut-out region.

7. Powertrain according to claim 1, wherein the reducing gear comprises at least a first and a second reducing gear stage and a differential, wherein at least one of the two reducing gear stages is embodied as spur gears.

8. Powertrain according to claim 1, wherein at least one non-mechanical energy transmitting external interface of the powertrain is located between the inverter unit and the reducing gear unit, wherein the at least one non-mechanical energy transmitting external interface is positioned on those parts of the inverter housing or of the electric motor housing within the convex hull of the reducing gear cover and the inverter housing.

9. Powertrain according to claim 1, wherein the parallel offset of the output reducing gear axis to the motor axis is determined by the diameter of the stator, wherein the ratio of the offset of the output reducing gear axis to the motor axis, to the diameter of the stator, and has numerical values between 0.5 and 1.0.

10. Powertrain according to claim 1, wherein the parallel offset of the output reducing gear axis to the motor axis is determined by the diameter of the stator, wherein the ratio of the offset of the output reducing gear axis to the motor axis, to the diameter of the stator, and has numerical values between 0.6 and 0.8.

11. Powertrain according to claim 1, wherein the inverter comprises a set of electrical components located in the intersection volume of a first half-space defined by a hypothetical plane, and the inverter housing interior volume, the hypothetical plane being orthogonal to a plane spanned by the output reducing gear axis and the motor axis, and containing the output reducing gear axis, wherein the electric motor is located within the first half-space, and the inverter comprises at least one additional electrical component placed in the intersection volume of a second half-space defined by the hypothetical plane, the second half-space being uniquely determined through the choice of the first half-space, wherein the union of the first half-space and the second half-space corresponds to the full three-dimensional space, and the inverter housing interior volume.

12. Powertrain according to claim 1, wherein the inverter comprises a first and a second set of electrical components, each of the two sets including at least one capacitor, at least three power switches, at least three bus bars and a liquid cooling device, wherein for every component of the first set a corresponding twin component in the second set exists with substantially equal electrical properties, wherein each component of the first set and its twin component in the second set are arranged at twin positions within the inverter housing interior volume with respect to the plane spanned by the output reducing gear axis and the motor axis, wherein the twin positions are characterized in that the orthogonal projections of any component of the first set and of its corresponding twin component in the second set onto the plane spanned by the output reducing gear axis and the motor axis are overlapping and substantially similar in size and shape, wherein the corresponding twin component is rotated in space around its geometric center by any amount before the orthogonal projection, wherein in particular no rotation at all is performed on the corresponding twin component before the orthogonal projection.

13. Powertrain according to claim 1, wherein the powertrain comprises a first liquid cooling circuit which is configured to cool the electrical components of the inverter as well as the stator of the electric motor, and the powertrain further comprises:
a second liquid cooling circuit which is configured to cool the reducing gear unit as well as the rotor and/or the stator of the electric motor; and
a heat exchanger which is configured to exchange heat between the first and the second liquid cooling circuit, wherein the heat exchanger is located in the volume enclosed by the convex hull of the reducing gear cover and the inverter housing.

14. Powertrain according to claim 13, the first liquid cooling circuit and/or the second liquid cooling circuit is further configured to cool the inductive charging module.

15. Powertrain according to claim 1, wherein an electromagnetic compatibility (EMC) filter is mounted in the inverter housing and/or the maximum rotational speed of the electric motor is configured to be between 12000 and 25000 rotations per minute.

16. Electric motor vehicle comprising a powertrain according to claim 1, wherein a driving wheel is connected via a drive shaft to each of the mechanical energy transmitting external interfaces.

17. Powertrain according to claim 2, wherein the inductive charging module is attached to a side of the powertrain, wherein the inductive charging module is in particular attached to a joint bottom side of the powertrain, wherein joint bottom refers to a side of the powertrain after integration into an electric motor vehicle.

18. Powertrain according to claim 17, wherein the inductive charging module is attached to a joint bottom side of the powertrain, wherein joint bottom refers to a side of the powertrain after integration into an electric motor vehicle.

\* \* \* \* \*